United States Patent [19]

Bednarz et al.

[11] Patent Number: 4,490,583
[45] Date of Patent: Dec. 25, 1984

[54] PLURAL LINE TELEPHONE CONTROLLER

[75] Inventors: John J. Bednarz, Elmhurst; William T. Bloodworth, Naperville, both of Ill.

[73] Assignee: Circom, Inc., Bensenville, Ill.

[21] Appl. No.: 611,382

[22] Filed: May 17, 1984

Related U.S. Application Data

[63] Continuation of Ser. No. 466,297, Feb. 14, 1983, abandoned.

[51] Int. Cl.$^3$ .............................................. H04M 1/00
[52] U.S. Cl. .............................. 179/99 R; 179/99 LC; 179/99 H; 179/81 R
[58] Field of Search ............ 179/99 H, 99 LC, 99 LS, 179/99 R, 84 T, 81 R, 81 C, 18 BC

[56] References Cited

U.S. PATENT DOCUMENTS

3,931,481  1/1976  Jackson ............................ 179/99 R
4,395,596  7/1983  Leitman et al. ................. 179/99 LC

Primary Examiner—Stafford D. Schreyer
Attorney, Agent, or Firm—Kinzer, Plyer, Dorn & McEachran

[57] ABSTRACT

A telephone controller for connecting a single-line telephone in a local N-line system with other telephones equipped with similar controller comprises N interface units each connecting one telephone line to a dual conductor telephone bus in turn connected to the telephone. Each interface unit includes an off-hook/ring detector connected to the telephone line served by that unit, a hold latch to connect a load of predetermined impedance across the telephone line to simulate an off-hook condition, a hold bus driver connected to a hold bus line extending to all system controllers, a telephone line condition indicator lamp that indicates on-hook, off-hook, incoming ring and hold conditions on the line, a line switch for connecting the telephone line to the telephone bus, an activity monitor to detect an off-hook condition for the telephone bus attributable to the associated telephone line, a telephone condition indicator lamp actuated by the activity monitor, a line selector switch, and line switch control circuits to close the line switch in response to actuation of the line selector switch and to keep it closed in response to detection of an off-hook condition by the activity monitor. The controller also comprises a hold switch, a hold latch control that actuates a hold latch when the hold switch is operated coincident with detection of an off-hook condition by the activity monitor associated with that hold latch, audible signal means to signal an incoming call, and a conference switch enabling conference calls.

37 Claims, 5 Drawing Figures

Fig. 2.

PLURAL LINE TELEPHONE CONTROLLER

This application is a continuation of application Ser. No. 466,297, filed Feb. 14, 1983 abandoned.

BACKGROUND OF THE INVENTION

A wide variety of telephone users, residential as well as commercial, require telephone installations in which calls can be received at or placed from a number of different telephones using any one of a limited number of telephone lines from a central office or from a private branch exchange (PBX). In the past, the requirements for installations of this kind have generally been met with key telephone systems. But conventional key telephone systems are not economically attractive when used with small installations involving only a few telephone lines (e.g., four or less) and a limited number of telephone stations (ten or less).

Thus, a conventional key telephone system requires a central control that must be connected to each individual telephone by a multi-conductor cable. The central control and system wiring for the key telephone system is quite complex and relatively costly, particularly in relation to any local system involving no more than four outside lines and no more than ten telephones. Further, each key system telephone and control circuit is usually constructed with provisions for key functions to accommodate the maximum number of telephone lines to which that telephone and control might be connected in a variety of different applications. That is, a conventional key telephone system is usually provided with at least a five line capacity and often more, a substantial excess for a residential or business application having only two or three telephone lines and only a few telephones.

One arrangement for a plural line telephone control system specifically adapted for use in small local systems is described in Rasmussen U.S. Pat. No. 4,132,860 and in Rasmussen et al U.S. Pat. No. 4,133,985. The control described in those two patents affords many of the operating features of a conventional key telephone system in an installation that provides for connection of a station control unit or converter between each telephone instrument and a limited number of telephone lines, usually no more than four lines. Each converter, like a conventional key telephone system instrument, provides a selector switch for each telephone line, together with a hold switch and hold circuits to permit a call to be placed in a hold condition. The system further includes a conference call arrangement that can be effected by simultaneous operation of two or more of the line selection switches.

The control apparatus described in the Rasmussen patents, however, requires special wiring between the converters and the telephone instruments; the bell or other audible signal device in each telephone must be disconnected from the normal actuation circuits in the telephone and re-connected to the control unit (converter) for that telephone. The control units, although equipped with indicators to show some conditions for the trunks and for the telephones, do not provide a full range of condition indications to enable a telephone user to determine all relevant operating conditions at any given time. The converters or control units are not readily adaptable to an increase in the number of telephone lines connected to the local system when such expansion is required. Moreover, the control units described in these patents require a substantial number of relays, at least one of which is continuously energized, and hence may have an undesirably high power consumption level.

SUMMARY OF THE INVENTION

It is a principal object of the present invention, therefore, to provide a new and improved telephone controller for connecting a single-line telephone in a local N-line system with other telephones equipped with similar controllers that is simple and inexpensive both in construction and in installation.

A further object of the invention is to provide a new and improved telephone controller for connecting a single-line telephone in a local N-line system that permits direct connection to the external input/output terminals of the telephone, with no necessity for any connection changes within the telephone.

Another object of the invention is to provide a new and improved telephone controller for connecting a single line telephone to a local N-line system with other telephones equipped with similar controllers that affords positive indications of line on-hook, line off-hook, line on hold, line ringing, telephone on-hook, and telephone off-hook conditions.

A further object of the invention is to provide a new and improved telephone controller for connecting a single line telephone in a local N-line system that is equally adaptable to use in a separate conversion unit or to incorporation in a composite telephone and controller instrument in a single housing.

A specific object of the invention is to provide a new and improved telephone controller for connecting a single line telephone in a local N-line system that allows for convenience of operation, including obtaining hold and conference functions each by actuation of a single switch, essentially similar to a conventional key telephone system but without requiring a central control.

An additional object of the invention is to provide a new and improved telephone controller for connecting a single-line telephone in a local N-line system with other telephones equipped with similar controllers that can be implemented in an all-electronic configuration or in a configuration employing a minimum number of relays with none of those relays requiring continuous excitation, so that the power drain for the controller is held to a minimum, and that allows for simple and inexpensive revision to accommodate one or more additional telephone lines.

Accordingly, the invention relates to a telephone controller for connecting a single-line telephone to any one of N two-conductor telephone lines, in a local system including a plurality of other single-line telephones equipped with similar controllers; the controller comprises a two-conductor telephone bus connected to the input/output terminals of the telephone and N interface units each connecting one of the telephone lines to the telephone bus. Each interface unit comprises off-hook/ring detector means for detecting off-hook and incoming ring signal conditions on the telephone line, hold latch means actuatable between an unlatched passive condition and a latched hold condition in which the hold latch means connects and maintains a load of predetermined impedance across the telephone line conductors to simulate an off-hook condition, hold bus driver means connected to the hold latch means and to a hold bus line that extends to the interface units for the same telephone line in all other controllers in the local system, for actuating the hold bus line from a normal operating state to a hold state whenever the hold latch means is in its latched hold condition, a telephone line condition indicator connected to the off-hook/ring detector means and to the hold bus line, for visually indicating on-hook, off-hook, incoming ring and hold conditions on the telephone line, line switch means for connecting the telephone line to the telephone bus, a line selector switch, line switch control means for closing the line switch means in response to actuation of the line selector switch, activity monitor means for detecting an off-hook condition for the telephone bus applicable to the telephone line to which the interface unit is connected, and line bridge means for maintaining the line switch means closed in response to detection of an off-hook condition by the activity monitor means. The telephone controller further comprises a hold switch and hold latch control means, connected to the hold switch and having input connections from the activity monitor means and output connections to the hold latch means in each interface unit of the controller, for actuating any one of the hold latch means to its latched hold condition upon actuation of the hold switch coincident with detection of an off-hook condition by the activity monitor means for the same telephone line as that hold latch means, and audible signal means, having input connections from the off-hook/ring detector means in each interface unit, for generating an audible signal whenever an incoming ring signal is detected on any of the N telephone lines.

DESCRIPTION OF THE PREFERRED EMBODIMENT

Figures 1, 1A, 4:
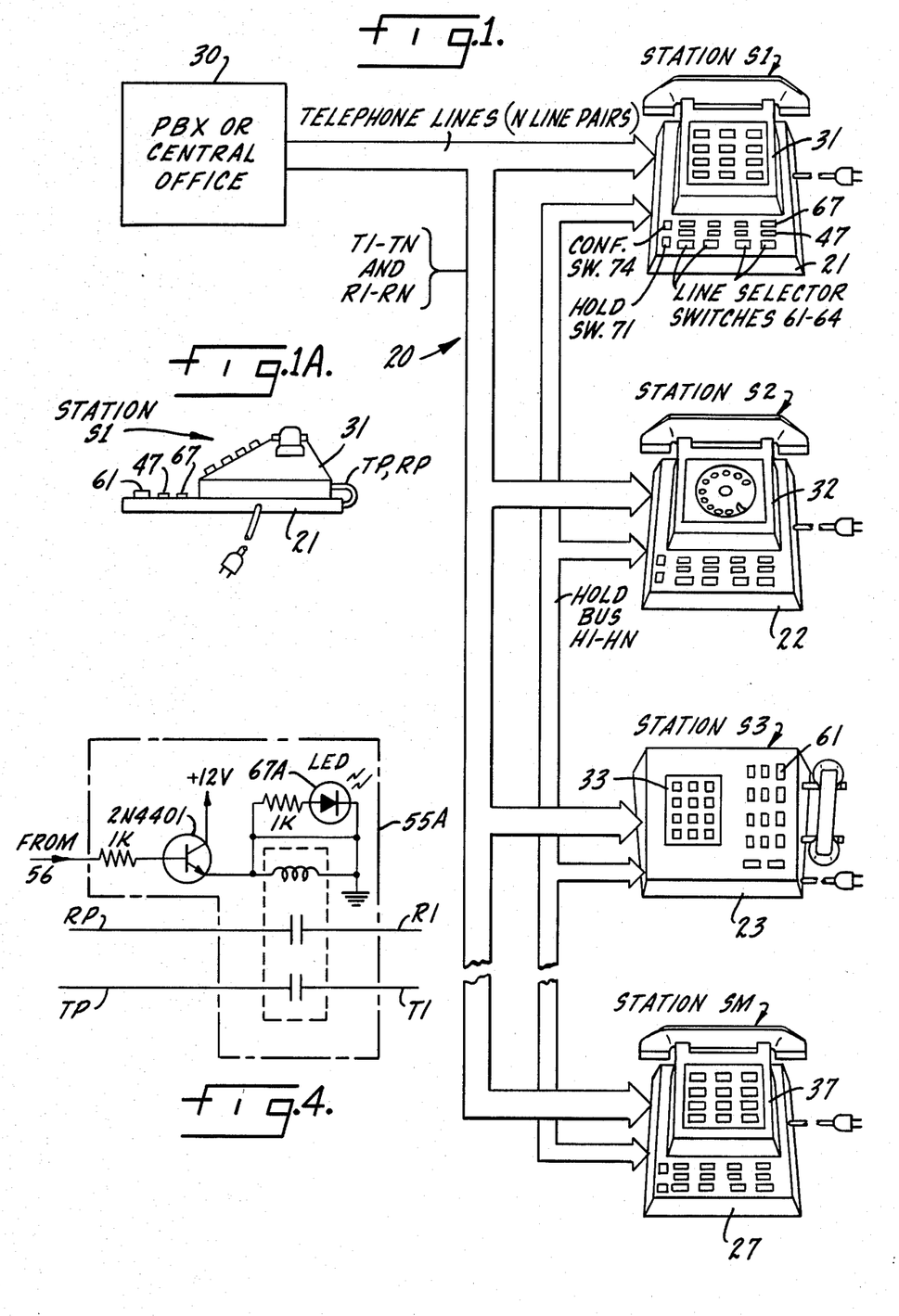
FIG. 1 is a generalized illustration of a local telephone system incorporating a plurality of telephone controllers constructed in accordance with the present invention.
FIG. 1A is a side elevation view of one of the telephone stations of FIG. 1.
FIG. 4 is a detail schematic diagram of a modification of the circuit of FIG. 3.

FIG. 1 illustrates a local telephone system 20 which incorporates a plurality of telephone controllers constructed in accordance with the present invention. System 20 includes a series of M telephone stations S1 through SM, each comprising a telephone controller and a conventional single-line telephone. M is variable; for system 20 it is assumed that M=7. The telephone 31 at station S1 is the type of instrument that utilizes tone dialing. The controller 21 at station S1 serves as a pedestal for telephone 31. The only connection between controller 21 and telephone 31 is a two-conductor telephone bus constituting the usual "tip" and "ring" conductors TP and RP; see FIG. 1A.

Station S2 includes a telephone instrument 32 and a controller 22. Controller 22 is of the same construction as controller 21 and affords a pedestal for telephone 32. Telephone 32 is a conventional single-line phone, essentially the same as instrument 31 except that it is a rotary dial phone.

Telephone station S3 incorporates the same operating elements as stations S1 and S2 but has the telephone 33 incorporated in a common housing with its controller 23, as in a conventional key telephone. Station SM is the same as station S1, and includes a controller 27 and a telephone 37.

The controllers 21,22, etc. in telephone system 20 are used to connect the individual telephones in stations S1 . . . SM to any one of N telephone lines. In FIG. 1 the telephone lines are shown as a bus including lines T1,R1 through TN,RN. All of the telephone lines may originate from a private branch exchange or central office 30; in an appropriate circumstance, some of the N telephone lines may originate from different central offices. All of the N telephone lines are connected to each of the controllers 21, 22, 23, 27 in the various stations S1 . . . SM of system 20. There is no direct connection from any of the telephone lines to the individual telephone instruments 31–37.

Local telephone system 20 further comprises a hold bus H1–HN interconnecting all of the controllers 21-27. The hold bus includes an individual line for each telephone line.

Figure 2:
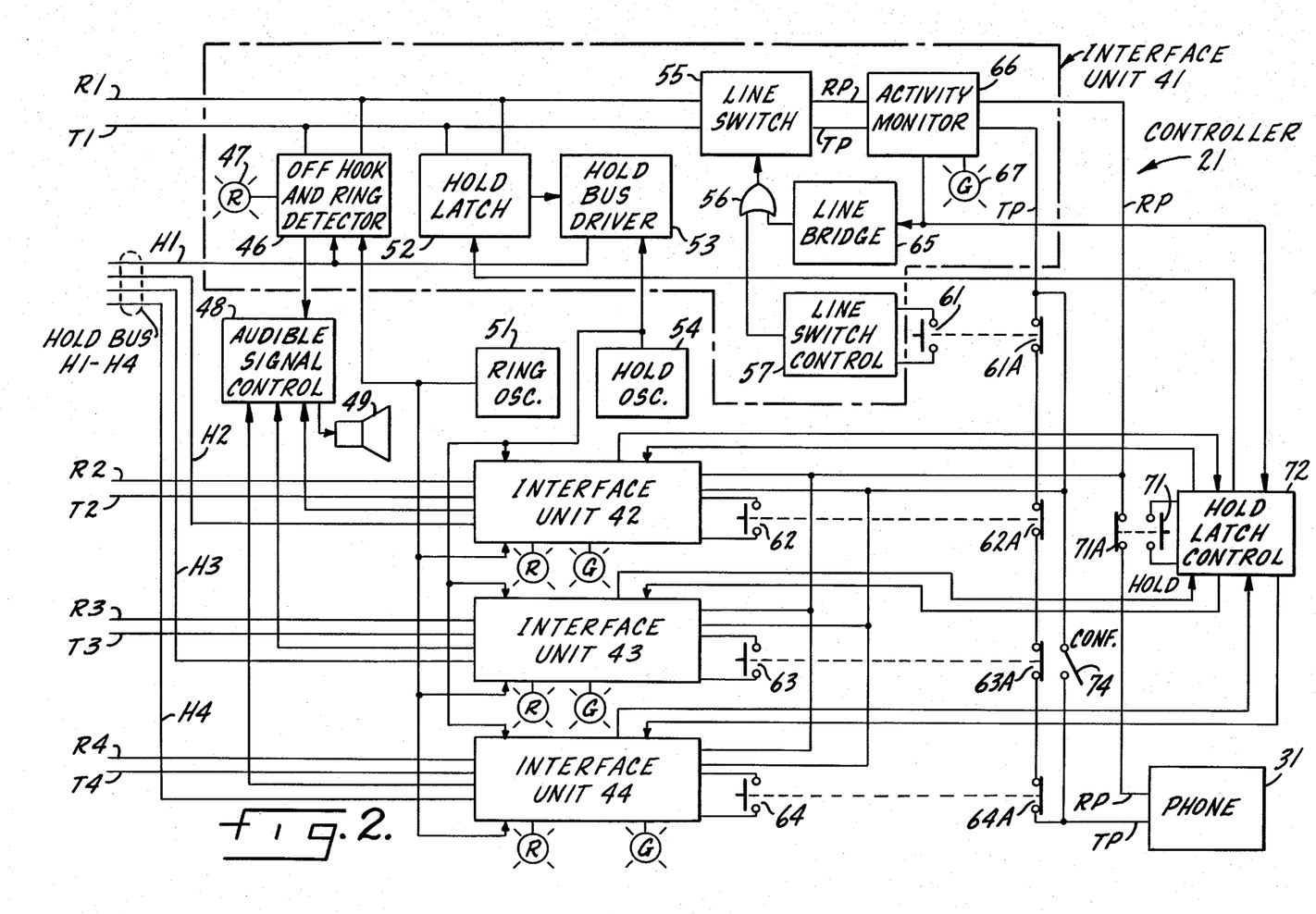
FIG. 2 is a block diagram of a telephone controller constructed in accordance with a preferred embodiment of the present invention.

The construction and organization of the telephone controllers of local system 20 can best be understood by reference to FIG. 2, which affords a block diagram for controller 21. All of the other controllers in system 20 have the same construction as controller 21. For FIG. 2, it is assumed that N=4, so that there are four telephone lines connected to controller 21, shown as lines R1,T1 through R4,T4.

Controller 21 includes four interface units 41,42,43 and 44 each connected to one of the telephone lines R1,T1 through R4,T4. Each interface unit 41-44 is also connected to a two-conductor telephone bus TP, RP that is in turn connected to the input/output terminals of the single-line telephone 31 served by controller 21. Each interface unit 41-44 has the same construction; accordingly, only interface unit 41 is shown in detail in FIG. 2.

Interface unit 41 comprises an off-hook/ring detector circuit 46 connected across the conductors R1 and T1 that form the first telephone line connected to controller 21. A line condition indicator lamp 47 is connected to detector circuit 46. Preferably, indicator 47 is a light emitting diode (LED). Detector 46 also has an output connection to an audible signal control 48 that is a part of controller 21 and that also serves all of the other interface units 42–44. Circuit 48 is an energizing circuit for an audio transducer 49 that serves as the audible signal source or "bell" for telephone 31. Controller 21 (FIG. 2) further comprises a ring oscillator 51. Oscillator 51 is connected to the off-hook/ring detector 46 in interface unit 41 and to the corresponding detector circuits in each of the other interface units 42–44.

Interface unit 41 includes a hold latch circuit 52 connected across the first telephone line R1,T1. Hold latch 52 is actuatable between a normal, unlatched passive condition and a latched hold condition in which it connects and maintains a load across line R1,T1 to simulate an off-hook condition for that line. Hold latch 52 has an output connection to a hold bus driver circuit 53 that is connected to the first line H1 of the hold bus for system 20 (see FIG. 1). This same hold bus line H1 is connected to the line condition indicator lamp 47 through detector circuit 46. The hold bus driver circuit 53 has an input from a hold oscillator 54; oscillator 54 is also connected to each of the other interface units 42–44. The operating frequency of hold oscillator 54 should be appreciably different from ring oscillator 51. Though two separate oscillators 51,54 are shown, a single oscillator with an appropriate frequency divider can be used.

Interface unit 41, FIG. 2, further comprises a line switch circuit 55 for connecting line T1,R1 to the telephone bus TP, RP. Line switch 55 is activatable from a normal open condition to a closed condition in response to an input signal from an OR gate 56. One input to gate 56 is derived from a line switch control circuit 57 to which a normally open momentary contact line selector switch 61 is connected. Each of the other interface units 42–44 is connected to a similar line selector switch, as shown by switches 62–64.

Another input to OR gate 56 in interface unit 41 is derived from a line bridge circuit 65. Line bridge 65 is actuated by a signal from an activity monitor 66 that is connected to that portion of telephone bus TP,RP immediately adjacent line switch 55. Monitor 66 provides an output signal to line bridge 65 whenever it detects an off-hook condition for telephone bus TP,RP that is attributable to the telephone line T1,R1 to which interface unit 41 is connected. Activity monitor 66 is also connected to a telephone condition indicator, shown as a lamp 67. The telephone condition indicator 67 is preferably an LED of a color different from indicator 47; in FIG. 2 device 47 is shown as a red indicator and device 67 as a green indicator, but other colors may be selected.

Gate 56, line switch control circuit 57, line bridge 65 and monitor 66 together comprise a line switch activation means to control the operation of line switch 55. The overall control function is such that line switch 55 is activated to its closed condition in response to actuation of line selector switch 61 and held closed, by line bridge 65, in response to detection of an off-hook condition by monitor 66.

Telephone controller 21 further comprises a momentary contact hold switch 71. The normally open contacts of hold switch 71 are connected to a hold latch control circuit 72. Hold latch control 72 has an input from activity monitor 66 and an output connection to hold latch 52 in interface unit 41. Hold latch control circuit 72 also serves the other interface units 42–44, and has corresponding input and output connections to each. The basic function of hold latch control circuit 72 is to actuate any one of the hold latches, such as latch 52, to its latched hold condition whenever hold switch 71 is operated in coincidence with detection of an off-hook condition by the corresponding activity monitor 66.

Telephone 31, as previously noted, has only the two usual input/output terminals and these are connected to telephone bus TP,RP. A set of normally closed hold switch contacts 71A are connected in series in conductor RP. A set of normally closed contacts 61A that are a part of the line selector switch 61 are connected in series in the other telephone bus conductor TP. Similarly, normally closed contacts 62A, 63A, and 64A of the remaining line selector switches 62, 63 and 64 are all connected in series in conductor TP. A conference switch 74 is incorporated in controller 21 in a circuit that shunts all of the selector switch contacts 61A–64A. Switch 74 is a sustained contact device that is normally maintained open, as shown.

RECEIVING A CALL

In considering the operation of controller 21 (FIG. 2) as a part of the local system 20 (FIG. 1), the first condition to be considered is the reception of an incoming call. For convenience, it is assumed that the incoming call originates on the first telephone line T1,R1 as indicated by the usual distinctive ring signal applied to that line from the central office or PBX 30.

The incoming ring signal on telephone line T1,R1 is initially detected by the off-hook/ring detector 46, FIG. 2. Once the incoming ring signal has been detected, circuit 46 connects the input signal from ring oscillator 51 to the line condition indicator 47 as an energizing signal, so that indicator 47 flashes on and off at a rate determined by the operating frequency of oscillator 51. This flashing signal, typically, may have a frequency of the order of one Hz. At the same time, the signal from ring oscillator 51 is supplied to circuit 48 by detector 46 to energize the audible signal device 49.

Assuming that there is some person within earshot of device 49 willing to answer telephone 31, that person hears the ringing or other sound from device 49 and observes that indicator 47 is flashing, showing that there is an incoming call on telephone line T1,R1. That person then closes line selector switch 61, which causes control 57 to supply an activating signal to line switch 55 through OR gate 56. Line switch control 57 is, essentially, a non-retriggerable one-shot device; when line selector switch 61 is closed, control 57 provides an activating signal to line switch 55 through OR gate 56 for a predetermined time interval, typically having a duration of one to two seconds. As a consequence, line switch 55 is activated to its closed condition and connects telephone line T1,R1 to telephone bus TP,RP. It is pertinent to note that line switch 55 will not remain activated on termination of the input signal from control 57 unless the receiver of telephone 31 is taken off-hook to establish a loop current through bus TP, RP and telephone 31. The relatively long duration of the output signal from line control switch 57 is provided to permit one-hand operation of telephone 31, allowing the user to pick up the telephone receiver without hurrying after actuating the line selector switch 61.

Assuming that telephone 31 goes off-hook before line switch control 57 times out, activity monitor 66 and line bridge circuit 65 now assume control of line switch 55. That is, activity monitor 66, which preferably incorporates an LED connected in series with line TP and an associated phototransistor amplifier, produces an output signal indicative of an off-hook condition for telephone 31, which signal is supplied to line bridge 65. This specific circuit arrangement is not essential; however, line activity monitor 66 must provide an output to bridge circuit 65 whenever telephone 31 is off-hook and that off-hook condition relates to a call on telephone line T1,R1.

At this point, the incoming call on line T1,R1 has been established. Activity monitor 66 and line bridge 65 continue to maintain line switch 55 activated (closed) as long as the call continues. The telephone condition indicator 67 is continuously energized by activity monitor 66 to afford a positive indication that telephone 31 is being utilized for this call. Of course, when telephone 31 went off-hook the incoming ring signal on telephone line T1,R1 was terminated by the normal operation of the external system circuits to which line T1,R1 is connected. Detector 46 sees an off-hook condition for line T1,R1 and energizes the line condition indicator 47 continuously to show that a call is in progress.

During the course of the call, a brief line polarity reversal may occur on telephone line T1,R1, or there may be a brief interruption on the telephone line external to system 20; either of these effects may be occasioned by supervisory activity at the PBX or central office 30 (FIG. 1). Line bridge 65 incorporates suitable delay circuitry to maintain line switch 55 in its activated condition for brief interruptions or polarity reversals of this nature. Typically, the delay in de-activation (opening) of line switch 55, determined by line bridge 65, is of the order of one hundred milliseconds.

The person answering telephone 31 for an incoming call may choose to pick up the telephone receiver before actuating line selector switch 61. This does not change the manner in which the call is established. When line selector switch 61 is actuated with the telephone receiver already off-hook, the initial activation of line switch 55 is still accomplished by line switch control 57 and the line switch is subsequently maintained in its activated closed condition by line bridge 65 in the manner described above.

PLACING AN OUTGOING CALL

To make an outgoing call on telephone line T1,R1 from telephone 31 (FIG. 2) the telephone user may first actuate line selector switch 61. When switch 61 is actuated, line switch control 57 provides an activating signal to line switch 55 through OR gate 56 and the line switch is closed, connecting telephone line T1,R1 to bus TP, RP. This condition is maintained for a predetermined time interval as described above to give the telephone user time to take telephone 31 off-hook. Assuming that the telephone goes off-hook before the delay interval of line switch control 57 expires, activity monitor 66 and line bridge 65 assume control of line switch 55 and maintain the line switch closed. Monitor 66 also energizes the telephone condition indicator 67 to provide a continuous indication of the line selected.

At this point, the telephone user begins dialing the number to be called. The tone or pulse dialing signals from telephone 31 are applied from bus TP,RP to line T1,R1 through line switch 55. These dial signals normally will not allow line switch 55 to be deactivated, unless there is an abnormally long interval between the dial signals allowing line bridge 65 to time out. Once dialing is completed, the normal loop current coming back to controller 21 on line T1,R1 from the central office or PBX 30 (FIG. 1) is detected by activity monitor 66 and keeps line switch 55 in its activated closed condition. Furthermore, detector 46 now sees an off-hook condition for line T1,R1 and continuously energizes the line condition indicator lamp 47. Establishment of the outgoing call is completed as usual, when the called telephone goes off-hook.

In placing an outgoing call on line T1,R1, the user of telephone 31 may elect to take the telephone off-hook before actuating line selector switch 61. This does not change the operation described above; the initial activation of line switch 55 is still effected by line switch control 57 with control of the line switch subsequently reverting to activity monitor 66 and line bridge 65.

TERMINATING A CALL

Assuming that a call is in progress between telephone 31 and some external location over line T1,R1, either an incoming call or an outgoing call, the call may be terminated simply by returning telephone 31 to an on-hook condition. When this is done, the telephone bus TP,RP is effectively open-circuited at telephone 31 so that there can be no appreciable current through activity monitor 66. That is, activity monitor 66 detects the on-hook condition for telephone 31 and interrupts the output signal, indicative of an off-hook condition, that has been previously supplied to line bridge 65. After the delay interval of line bridge 65 expires, the activation output signal from that circuit to line switch 55 is interrupted and the line switch reverts to its unactivated open condition. Also, when activity monitor 66 identifies the on-hook condition for telephone 31, it de-energizes the telephone condition indicator 67. When detector 46 subsequently determines that line T1,R1 is in its on-hook condition, telephone line indicator 47 is de-energized. At this point, the call has been terminated and all indications of the call have ended.

Of course, a call may also be terminated by the remote telephone going on-hook, reflected in the operating condition of telephone line T1,R1. When this occurs, however, the normal loop current on telephone line T1,R1 is not interrupted. Consequently, detector 46 does not detect an on-hook condition. The line activity monitor 66 continues to detect an off-hook condition and, through line bridge 65, maintains line switch 55 in its closed condition. The person using telephone 31 perceives that the remote telephone has gone on-hook, and terminates the call by placing telephone 31 on-hook, as described in the preceding paragraph.

One way to terminate a call on line T1,R1 without actually placing telephone 31 on-hook is to actuate one of the other line selector switches 62-64. Thus, if a person that has been engaged in a call from telephone 31 on line T1,R1 desires both to terminate that call and to initiate a call on line T2,R2, it is not necessary to hang up telephone 31. Instead, the user can simply actuate line selector switch 62. When this is done, contacts 62A of that switch open conductor TP of the telephone bus. This effectively terminates the initial call on line T1,R1, in the same manner as if telephone 31 had actually gone on-hook, and the user of the telephone is able to proceed immediately with dialing of a new call.

PUTTING A CALL ON HOLD

In the course of a telephone call, again assumed to be taking place on telephone line T1,R1, the person using telephone 31 may wish to put the call on "hold" in order to transfer the call, to make another call for informational purposes, or for a variety of other reasons. In these circumstances, the telephone user actuates hold switch 71. This opens contacts 71A, which produces an open circuit in telephone bus conductor RP that would normally result in termination of the call. However, the actuation of hold switch 71 also actuates hold latch control circuit 72 coincident with an off-hook condition signal to circuit 72 from activity monitor 66, since there has been a call in progress. Under these conditions, control 72 supplies a signal to hold latch 52 that actuates the hold latch from its normal unlatched passive condition to its latched hold condition, in which latch 52 connects and maintains a load circuit of predetermined impedance across line R1,T1 to simulate an off-hook condition.

Furthermore, when hold latch 52 is actuated to its latched hold condition, it supplies an output signal to hold bus driver 53. Driver 53 connects the output of hold oscillator 54 to the hold bus line H1 that is associated with telephone line R1,T1 and interface unit 41. The output signal from oscillator 54 thus supplied to hold bus line H1 is also applied to indicator lamp 47 to cause that indicator to flash on and off at the frequency of oscillator 54. The operating frequency for oscillator 54 is selected to be distinctively different from that of ring oscillator 51, so that there is a visual indication that line R1,T1 is now on hold and the hold condition can be readily distinguished from an incoming ring signal condition. In addition, the output signal from oscillator 54 and bus driver circuit 53 on line H1 causes the line condition indicator lamps 47 for line R1,T1 to flash at all of the other controllers in system 20 (FIG. 1). Typically, the frequency for oscillator 54 may be about four Hz.

When hold switch 71 is actuated to open contacts 71A, so that conductor RP of the telephone bus is now open-circuited, as described, activity monitor 66 detects an effective on-hook condition for telephone 31 and de-energizes telephone condition indicator lamp 67. Furthermore, the output from activity monitor 66 to line bridge 65 is interrupted, the line bridge circuit times out, and the activating signal from line bridge 65 to line switch 55 is discontinued so that the line switch reverts to its unactivated (open) condition. The user of telephone 31 can now place another call; the pre-existing call remains on hold for an indeterminate interval.

REMOVING A CALL FROM HOLD

In the preferred construction of the telephone controller of the present invention, the hold latch 52 in each interface unit 41 incorporates a load circuit of predetermined impedance connected across telephone lines R1 and T1; that load circuit includes a switching device actuated by the input from hold latch control 72 and also includes, in series, a threshold device that is conductive only when the voltage across telephone line conductors T1 and R1 exceeds a given threshold level that is appreciably higher than the voltage level that obtains when line switch 55 is closed. This threshold device may be a zener diode, as shown in the specific circuit illustrated in FIG. 3 or it may comprise an operational amplifier or like device connected to be conductive only in response to a given minimum threshold level.

When a call on line T1,R1 has been placed on hold, as described above, the party using telephone 31 may subsequently desire to remove the call from the hold condition and to resume the call. This is accomplished simply by actuation of the line selector switch 61 to again activate line switch 55 to its closed condition. When line switch 55 closes, the voltage across telephone line R1,T1 drops below the threshold level for the load circuit of hold latch 52. Consequently, the telephone line is removed from the previously established hold condition and the call can be resumed from telephone 31 without further action. Similarly, actuation of the line selector switch 61 for any of the other telephones in system 20 (FIG. 1), with the telephone in an off-hook condition, is effective to reduce the voltage across the conductors T1 and R1 to a level below the threshold of the hold latch that has established a hold condition for that telephone line; the other telephone now has a call established on line T1,R1, the hold condition having been removed in the same manner as in the case of telephone 31.

CONFERENCE CALLS

Normally, if a person using telephone 31 has been conducting a call on, for example, telephone line T2,R2, and desires to terminate that call and place another call on line T1,R1, that person actuates line selector switch 61 as the first step in initiating the new call. When switch 61 is actuated, its contacts 61A open; this interrupts the telephone bus line TP, producing an apparent on-hook condition for the old call and terminating that call as described above. Simultaneously, line switch control 57 is actuated to activate line switch 55 to closed condition. When line select switch 61 is released the telephone bus line TP is again complete through contacts 61A and line T1,R1 goes off-hook for the new call, but the old call has been lost.

If conference switch 74 is closed, however, it shunts all of the normally closed contacts 61A-64A of the line selector switches. Consequently, assuming again that a call has been in progress on telephone line T2,R2, if conference switch 74 is closed then actuation of line selector switch 61 for placement of a new call on line T1,R1 does not disconnect the first call. Thus, the line switch in interface unit 42 remains in its activated closed condition even though line switch control 57 in interface unit 41 is actuated to close its line switch 55 and complete a circuit from line T1,R1 to telephone bus TP,RP. Thus, the first call is maintained though a new call is initiated.

For a conference involving plural incoming calls, it is only necessary to close conference switch 74. This permits additional incoming calls to be combined in conference mode simply with an existing call by answering each of the incoming calls as received. For conferencing of outgoing calls, it is desirable to place any previously established calls on hold when dialing an additional outgoing call so that the dial pulses from telephone 31 are not transmitted over the line already in use.

SPECIFIC CIRCUITS (FIGS. 3 AND 4)

Figure 3:
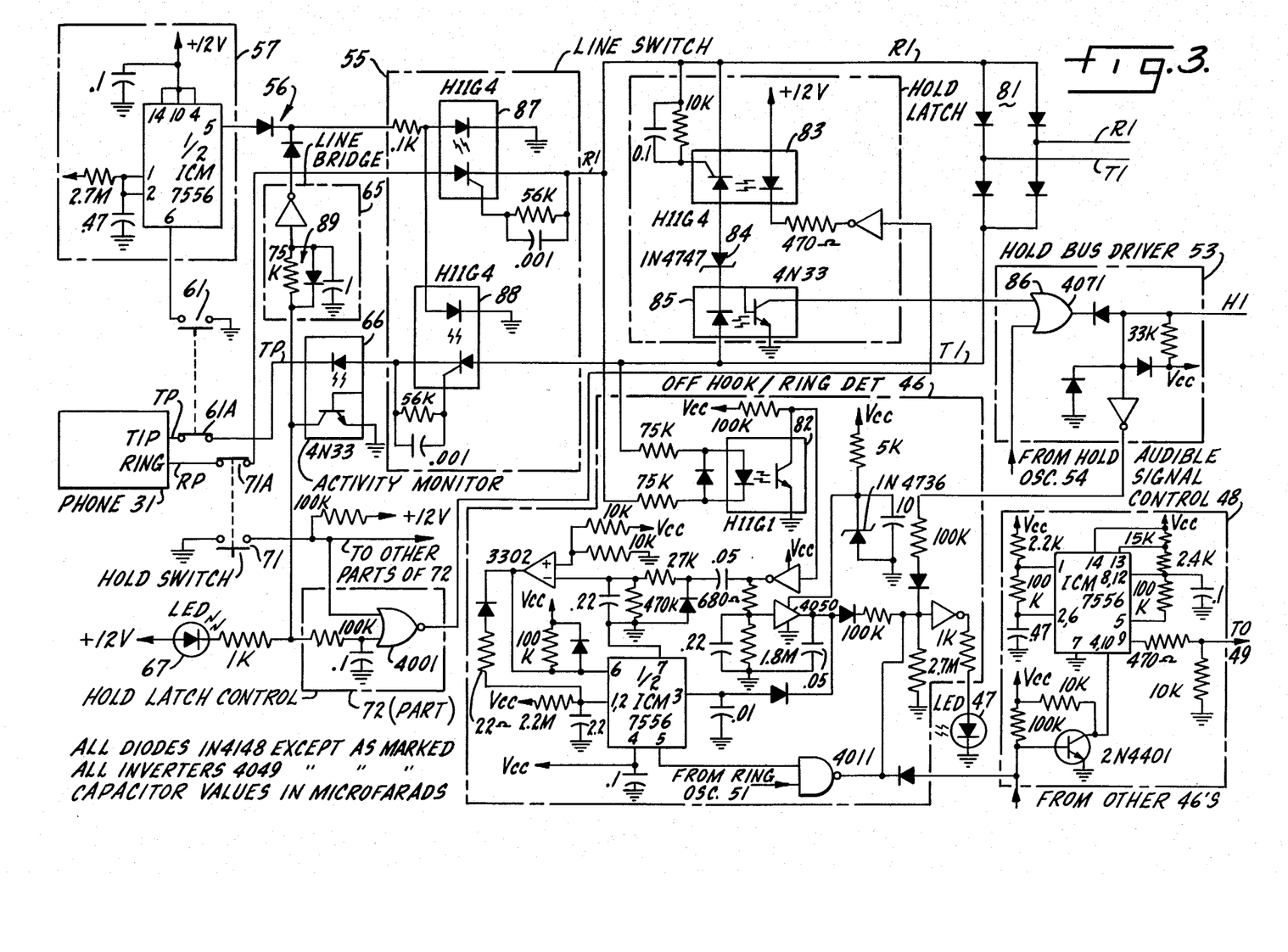
FIG. 3 is a detailed schematic diagram of the principal operating circuits for the controller of FIG. 2.

FIG. 3 affords a detailed circuit diagram, complete with impedances and other specific circuit parameters, for one embodiment of a complete interface unit and for the other principal operating circuits of a telephone controller constructed in accordance with the present invention. Although the construction and operation of the controller will be apparent to those skilled in the art without further description, some discussion of specific circuit features and components is in order for the purpose of identification of particularly desirable operational features.

In the upper right-hand portion of FIG. 3, where the telephone line conductors R1 and T1 are connected to the controller, a diode bridge 81 is preferably incorporated in the circuit. Bridge circuit 81 is utilized to accommodate reverse polarity arrangements that are provided by some private branch exchange units to which the controller might be connected. The use of bridge 81 makes it possible to eliminate a number of blocking diodes that might otherwise be required in each interface unit of the controller.

The off-hook/ring detector 46, in the circuit arrangement illustrated in FIG. 3, incorporates an optically isolated switching device 82, affording a connection to the telephone line conductors R1 and T1 as extended into the telephone controller. This arrangement avoids undesirable loading of the telephone line conductors.

The output from the optically isolated switch 82 in detector 46 provides for detection of incoming ring signals, supplied to the telephone line condition indicator 47 and the audible signal control circuit 48 through the Type 4050 amplifier. It also allows for detection of an off-hook condition, through the circuit incorporating the Type 3302 amplifier, used as a comparator, and the Type ICM 7556 timer circuit. The timer circuit in detector 46 is provided to compensate for any momentary interruptions in the off-hook condition that might be caused by supervisory action in the telephone system to which line R1,T1 is connected. As shown, the telephone line condition indicator lamp 47 is preferably a light emitting diode. In FIG. 3 the audible signal control 48 incorporates a Type ICM 7556 timer circuit as the driver for the audible transducer 49, the timer circuit being triggered on and off at the frequency of ring oscillator 51 through the connection provided in detector 46 by the NAND gate Type 4011.

The circuit of hold latch 52, in the embodiment illustrated in FIG. 3, incorporates an optically actuated signal controlled rectifier switch 83 in series with a zener diode and a further optically actuated switching device 85 in a load circuit that is connected across the conductors R1 and T1 of the incoming telephone line. When the photo-actuated SCR 83 in hold latch 52 is activated by a hold latch control signal from circuit 72, this load circuit is completed and drops the voltage between telephone line conductors R1 and T1 to approximately twenty-two volts. The load circuit 83-85 draws enough current from the telephone line R1,T1 so that the line appears to be off-hook to any remote station. However, whenever any telephone in the local system (e.g., phone 31) goes off-hook with respect to telephone line T1,R1, the tip-to-ring voltage drops to approximately eight volts. At this voltage, the zener diode 84 in the load circuit of hold latch 52 will not conduct and, consequently, the SCR switch 83 commutates and effectively disconnects the hold latch 52 from the telephone line R1,T1.

In the specific circuit illustrated for hold bus driver 53 in FIG. 3, the gate 86, though shown as an OR gate, functions as an AND gate with respect to the output of hold latch 52 and the signal from hold oscillator 54. The output from gate 86 is supplied both to the hold bus H1 and to the telephone line condition indicator lamp 47, the latter connection being made through the output circuit of detector 46.

In the circuit of FIG. 3, line switch 55 comprises a pair of optically actuated SCR switches 87 and 88, one interposed between each conductor of the telephone line R1,T1 and the corresponding conductor of the telephone bus RP,TP. This circuit arrangement, in line switch 55, affords effective isolation for the control circuits that actuate line switch 55, constituting the line switch control 57 and line bridge 65. This arrangement is preferred because it helps to hold the physical size of the telephone controller to a minimum and also minimizes the power requirements of the telephone controller. Line switch control circuit 57 utilizes a Type ICM 7556 timer to provide an activating output signal to line switch 55 that maintains the line switch closed for a predetermined time interval following actuation of the line selector switch 61 to facilitate one-hand operation of telephone 31 as described above. Preferably, the output from control 57 through OR gate 56 to line switch 55, following actuation of line selector switch 61, endures for a time interval of the order of one to two seconds. Further, it will be noted that the line bridge 65 that constitutes the second input to OR gate 56 incorporates an R-C time delay circuit 89 for effective compensation for momentary supervisory or other line interruptions on the telephone line. Activity monitor 66, in the circuit arrangement shown in FIG. 3, again uses a photo-optically isolated switching device for sensing line current in the telephone bus, specifically in conductor TP in that bus.

In some applications, particularly those involving high noise levels on the telephone lines, it may be difficult to avoid false actuation of optically isolated SCR switches like devices 87 and 88 in line switch 55 as shown in FIG. 3. In those circumstances, a relay may be utilized for the line switch, as shown by line switch circuit 55A in FIG. 4. FIG. 4 also shows a minor modification for connection of the telephone bus condition indicator lamp 67A, again an LED, as compared with FIG. 3. Otherwise, the incorporation of the relay form of line switch requires no further modification of the circuit of FIG. 3.

As will be seen from the foregoing description, the telephone controller of the invention provides connections from a single-line telephone to N telephone lines in a local system with other telephones equipped with similar controllers, a system that is both simple and inexpensive in construction and in installation. The telephone controllers are directly connected to the external tip and ring input/output terminals of the telephones, with no requirement for any internal connections or circuit changes in the telephones. The telephone line condition indicator lamps 47 of the controller provide positive indications of on-hook, off-hook, hold, and ringing conditions on each telephone line, whereas the telephone condition indicator lamps 67 afford effective on-hook and off-hook indications for the telephone itself. The telephone controllers can be made as separate conversion units. On the other hand, a composite telephone and controller instrument may be incorporated in a single housing. The only interconnection between the individual telephone controllers of a complete system, apart from the telephone lines, comprises the hold bus, with but one line for each telephone line. Hold and conference functions are each afforded by actuation of a single switch in a manner essentially similar to a key telephone system but without requiring a central control. The complete telephone controller of the invention is readily implemented in an all-electronic configuration as illustrated by FIG. 3 or, for some applications, may be constructed with a minimum number of relays, just one simple relay for each line switch in the controller, as in FIG. 4. In no instance is there any requirement for maintenance of a relay in a continuously energized condition. Thus, the power drain for the controller is minimized. By employing a modular construction for the controller, allowing for the addition of further interface units to accommodate additional telephone lines, the controller allows for simple and inexpensive revision in relation to the number of telephone lines served.

We claim:

1. A telephone controller for connecting a single-line telephone to any one of N two-conductor telephone lines, in a local system including a plurality of other single-line telephones equipped with similar controllers, the controller comprising:

a two-conductor telephone bus connected to the input/output terminals of the telephone;

monitor means for detecting an off-hook condition of the telephone;

N interface units each connecting one of the telephone lines to the telephone bus, each interface unit comprising:

off-hook/ring detector means for detecting off-hook and incoming ring signal conditions on the telephone line;

hold latch means actuatable between an unlatched passive condition and a latched hold condition in which the hold latch means connects and maintains a load of predetermined impedance across the telephone line conductors to simulate an off-hook condition;

a telephone line condition indicator connected to the off-hook/ring detector means and to the hold bus line, for visually indicating on-hook, off-hook, incoming ring and hold conditions on the telephone line;

line switch means for connecting the telephone line to the telephone bus;

a line selector switch;

line switch control means for closing the line switch means in response to actuation of the line selector switch;

and line bridge means for maintaining the line switch means closed in response to detection of an off-hook condition by the monitor means;

the telephone controller further comprising:

a hold switch;

hold latch control means, connected to the hold switch and having an input connection from the activity monitor means and output connections to the hold latch means in each interface unit of the controller, for actuating any one of the hold latch means to its latched hold condition upon operation of the hold switch coincident with detection of an off-hook condition by the activity monitor means for the same telephone line as that hold latch means;

and audible signal means, having input connections from the off-hook/ring detector means in each interface unit, for generating an audible signal whenever an incoming ring signal is detected on any of the N telephone lines.

2. A telephone controller according to claim 1 in which each hold latch means comprises an optically actuated semiconductor switch in series with a load circuit connected across the telephone line conductors, the load circuit including a threshold device conductive only when the voltage across the telephone lines exceeds a given threshold level.

3. A telephone controller according to claim 2 in which each line switch means comprises a pair of optically actuated signal controlled rectifier switches, one interposed between each conductor of the telephone line and the corresponding conductor of the telephone bus.

4. A telephone controller according to claim 2 in which each line switch means comprises a relay including two sets of normally open contacts, one set interposed between each conductor of the telephone line and the corresponding conductor of the telephone bus.

5. A telephone controller according to claim 2 in which the monitor means comprises N activity monitor circuits, one in each interface unit, for detecting an off-hook condition applicable to the telephone line to which the interface unit is connected, and each activity monitor comprises an optically actuated semiconductor switch.

6. A telephone controller according to claim 1 in which each line switch means comprises a pair of optically actuated signal controlled rectifier switches, one interposed between each conductor of the the telephone line and the corresponding conductor of the telephone bus.

7. A telephone controller according to claim 6 in which the monitor means comprises N activity monitor circuits, one in each interface unit, for detecting an off-hook condition applicable to the telephone line to which the interface unit is connected, and each activity monitor comprises an optically actuated semiconductor switch.

8. A telephone controller according to claim 1 in which each line bridge means includes a delay circuit to maintain the line switch means closed in the event of a momentary interruption on the telephone line.

9. A telephone controller according to claim 8 in which each hold latch means comprises an optically actuated semiconductor switch in series with a load circuit connected across the telephone line conductors, the load circuit including a threshold device conductive only when the voltage across the telephone lines exceeds a given threshold level.

10. A telephone controller according to claim 9 in which each line switch means comprises a pair of optically actuated signal controlled rectifier switches, one interposed between each conductor of the telephone line and the corresponding conductor of the telephone bus.

11. A telephone controller according to claim 9 in which the monitor means comprises N activity monitor circuits, one in each interface unit, for detecting an off-hook condition applicable to the telephone line to which the interface unit is connected, and each activity monitor comprises an optically actuated semiconductor switch.

12. A telephone controller according to claim 1 in which each line switch control means includes a timer to maintain the line switch means closed for a predetermined time interval following actuation of the line selector switch to facilitate one hand operation of the telephone.

13. A telephone controller according to claim 12 in which the time interval for the line switch control means timer is of the order of one to two seconds.

14. A telephone controller according to claim 12 in which each hold latch means comprises an optically actuated semiconductor switch in series with a load circuit connected across the telephone line conductors, the load circuit including a threshold device conductive only when the voltage across the telephone lines exceeds a given threshold level.

15. A telephone controller according to claim 14 in which each line switch means comprises a pair of optically actuated signal controlled rectifier switches, one interposed between each conductor of the telephone line and the corresponding conductor of the telephone bus.

16. A telephone controller according to claim 14 in which the monitor means comprises N activity monitor circuits, one in each interface unit, for detecting an off-hook condition applicable to the telephone line to which the interface unit is connected, and each activity monitor comprises an optically actuated semiconductor switch.

17. A telephone controller according to claim 1, in which:
each interface unit comprises hold bus driver means connected to the hold latch means and to a hold bus line that extends to the interface units for the same telephone line in all other controllers in the local system, for actuating the hold bus line from a normal operating state to a hold state whenever the hold latch means is in its latched hold condition; and
the controller further comprises a hold oscillator connected to the hold bus driver means in each interface unit, in which each hold bus driver means connects the hold oscillator to the associated hold bus line when the associated hold latch is in its hold state.

18. A telephone controller according to claim 17 in which each hold latch means comprises an optically actuated semiconductor switch in series with a load circuit connected across the telephone line conductors, the load circuit including a threshold device conductive only when the voltage across the telephone lines exceeds a given threshold level.

19. A telephone controller according to claim 17 in which each line selector switch is a momentary contact switch having one set of contacts connected to the line switch control means and a second set of normally closed contacts connected in series in one conductor of the telephone bus to open that bus momentarily each time the line selector switch is actuated.

20. A telephone controller according to claim 19 and further comprising a sustained contact conference switch connected in shunt relation to all of the normally closed contacts of the line selector switches, closing of the conference switch with a call in progress on one telephone line permitting completion of an additional call on another line to establish a conference call.

21. A telephone controller according to claim 20 in which each hold latch means comprises an optically actuated semiconductor switch in series with a load circuit connected across the telephone line conductors, the load circuit including a threshold device conductive only when the voltage across the telephone lines exceeds a given threshold level.

22. A telephone controller according to claim 20 in which the controller further comprises a hold oscillator connected to the hold bus driver means in each interface unit, and in which each hold bus driver means connects the hold oscillator to the associated hold bus line when the associated hold latch is in its hold state.

23. A telephone controller according to claim 20 in which each line switch means comprises a pair of optically actuated signal controlled rectifier switches, one interposed between each conductor of the telephone line and the corresponding conductor of the telephone bus.

24. A telephone controller according to claim 20 in which the monitor means comprises N activity monitor circuits, one in each interface unit, for detecting an off-hook condition applicable to the telephone line to which the interface unit is connected, and each activity monitor comprises an optically actuated semiconductor switch.

25. A telephone controller according to claim 17 in which the audible signal means comprises:
an audio transducer for generating an audible signal;
a low-frequency ring oscillator; and
audible signal control means, having inputs from the ring oscillator and the off-hook detection means, for actuating the transducer at a repetition frequency determined by the ring oscillator in response to detection of an incoming ring signal on any one of the N telephone lines.

26. A telephone controller according to claim 25 in which the frequency of the hold oscillator is distinctively different from the frequency of the ring oscillator.

27. A telephone controller according to claim 1 in which the off-hook/ring detector means comprises an optically actuated semiconductor switch having its input connected across the conductors of the telephone line, and a delay circuit to maintain an off-hook output for a predetermined time delay interval upon interruption of an actual off-hook telephone line condition to compensate for momentary interruptions in telephone line current.

28. A telephone controller according to claim 1 in which the line bridge means comprises a delay circuit for maintaining the line switch means closed for a predetermined time delay interval following interruption of detection of an off-hook condition by the activity monitor means.

29. A telephone controller according to claim 28 in which the off-hook/ring detector means comprises an optically actuated semiconductor switch having its input connected across the conductors of the telephone line, and a delay circuit to maintain an off-hook output for a predetermined time delay interval upon interruption of an actual off-hook telephone line condition to compensate for momentary interruptions in telephone line current.

30. A telephone controller according to claim 29 in which each hold latch means comprises an optically actuated semiconductor switch in series with a load circuit connected across the telephone line conductors, the load circuit including a threshold device conductive only when the voltage across the telephone lines exceeds a given threshold level.

31. A telephone controller according to claim 30 in which each line switch means comprises a pair of optically actuated signal controlled rectifier switches, one interposed between each conductor of the telephone line and the corresponding conductor of the telephone bus.

32. A telephone controller according to claim 31 in which the monitor means comprises N activity monitor circuits, one in each interface unit, for detecting an off-hook condition applicable to the telephone line to which the interface unit is connected, and each activity monitor comprises an optically actuated semiconductor switch.

33. A telephone controller according to claim 1 in which each line switch means comprises a relay including two sets of normally open contacts, one set interposed between each conductor of the telephone line and the corresponding conductor of the telephone bus.

34. A telephone controller according to claim 9 in which each line switch means comprises a relay including two sets of normally open contacts, one set interposed between each conductor of the telephone line and the corresponding conductor of the telephone bus.

35. A telephone controller according to claim 14 in which each line switch means comprises a relay including two sets of normally open contacts, one set interposed between each conductor of the telephone line and the corresponding conductor of the telephone bus.

36. A telephone controller according to claim 30 in which each line switch means comprises a relay including two sets of normally open contacts, one set interposed between each conductor of the telephone line and the corresponding conductor of the telephone bus.

37. A telephone controller according to claim 1 in which the audible signal means comprises:

an audio transducer for generating an audible signal;
a low-frequency ring oscillator; and
audible signal control means, having inputs from the ring oscillator and the off-hook detection means, for actuating the transducer at a repetition frequency determined by the ring oscillator in response to detection of an incoming ring signal on any one of the N telephone lines.

* * * * *